Feb. 20, 1945.   J. A. REYNIERS   2,369,980
FILM FEEDING DEVICE
Filed June 28, 1941   2 Sheets-Sheet 1
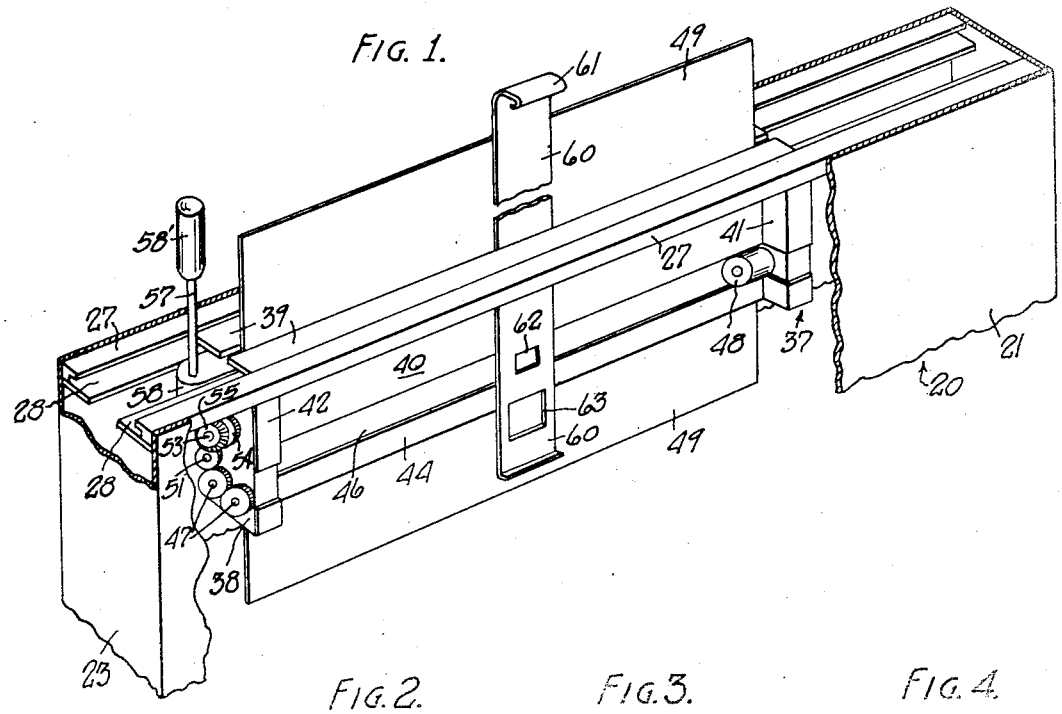
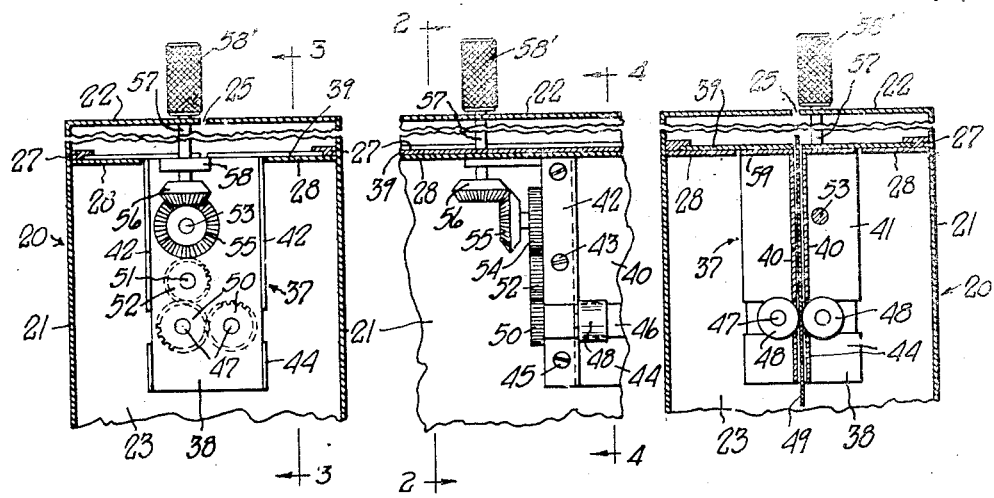
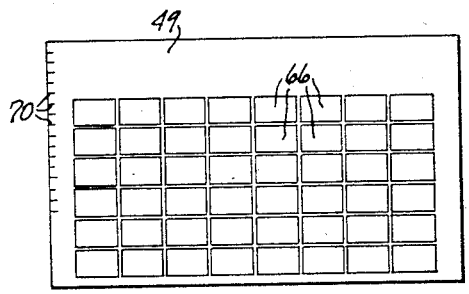
INVENTOR.
JAMES A. REYNIERS
BY Oltsch & Knoblock
Attorneys.

Feb. 20, 1945.  J. A. REYNIERS  2,369,980
FILM FEEDING DEVICE
Filed June 28, 1941  2 Sheets-Sheet 2
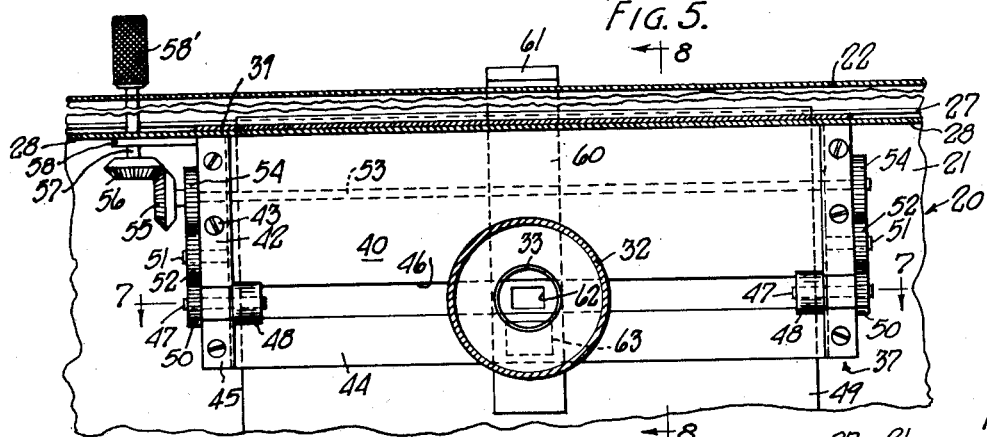
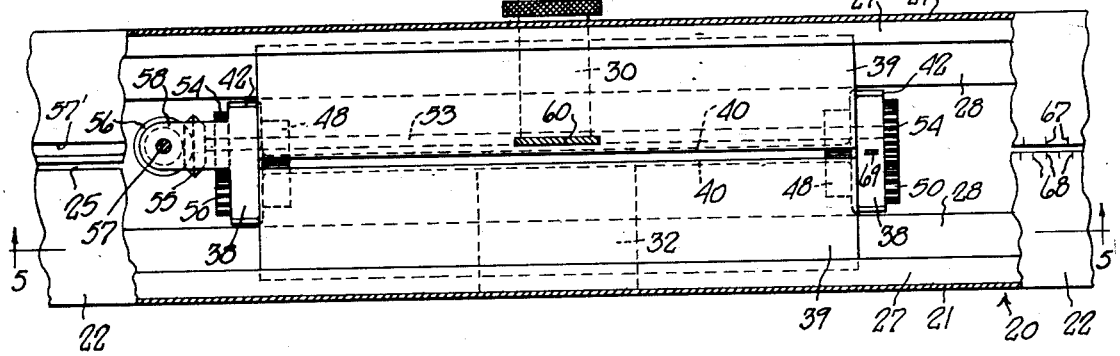
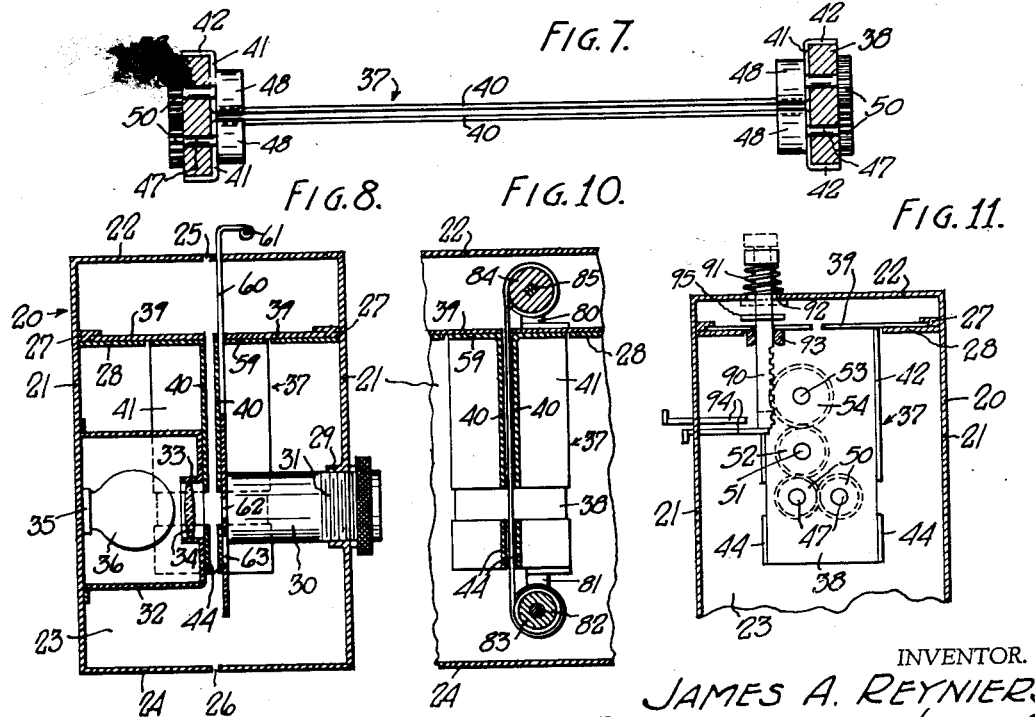
INVENTOR.
JAMES A. REYNIERS
BY
Oltsch & Knoblock
Attorney.

UNITED STATES PATENT OFFICE 2,369,980

FILM FEEDING DEVICE

James A. Reyniers, South Bend, Ind.

Application June 28, 1941, Serial No. 400,245

14 Claims. (Cl. 88—28)

This invention relates to a film feeding device, and more particularly to a device for mounting and shifting photographic film relative to a lens mount in two directions at right angles to each other and in the same plane.

The device is particularly intended for use in photographing micro images, and in projecting micro images, arranged upon a film in rows aligned transversely and longitudinally of the film.

The primary object of the invention is to provide a compact, simple, and inexpensive apparatus for moving a flat film in two directions with respect to a photographic or projecting lens.

A further object is to provide an apparatus for accurately positioning photographic images in rows aligned longitudinally and transversely upon the surface of a film.

A further object is to provide an apparatus which will permit a predetermined portion of the field of a film to be exposed and relocated.

A further object is to provide a device of this character having a casing, a film holder, slidable within said casing, feed rollers journaled by the film holder about axes parallel to the path of the movement of the film holder for gripping the margins of a film therebetween, and means for simultaneously and equally rotating said rollers.

A further object is to provide a device of this character having a film holder including a pair of close spaced parallel plates between which a film is freely slidable, and a set of rollers adjacent each end of said holder for gripping the margins of said film and feeding said film through said holder.

A further object is to provide a device of this character having a casing fixedly carrying a lens mount terminating within the casing, a film holder slidable in said casing and juxtaposed to the inner end of said lens carrier, and means for advancing said film within said film holder.

A further object is to provide a device of this character having a casing, a film holder slidable within said casing, and means for advancing a film within said holder, wherein said holder has an elongated opening therein parallel to the path of movement of said holder and registering with a lens mount carried by said casing.

A further object is to provide a device of this character having a casing, a film carrier slidable in said casing and mounting a film reel, and means carried by said holder for advancing film through said holder, wherein said holder positions a film in flat form juxtaposed to a lens mount.

A further object is to provide a device of this character having a casing mounting a lens mount, and a light chamber in alignment, and slidably mounting a film holder between said light chamber and lens mount and a slide between said lens mount and said holder, wherein said film holder has an elongated opening therethrough registering with said lens mount and light chamber and said slide has a small aperture for restricting the size and shape of the light path through a film in said holder.

A further object is to provide a device of this character having a film holder slidably mounted within a casing and provided with a narrow passage for slidably receiving a film and for holding said film in flat form therein.

Other objects will be apparent from the description, drawings, and appended claims.

In the drawings:

Fig. 1 is a fragmentary perspective view of my device, with parts broken away.

Fig. 2 is a transverse vertical sectional view taken on line 2—2 of Fig. 3.

Fig. 3 is a fragmentary longitudinal vertical sectional detail view taken on line 3—3 of Fig. 2.

Fig. 4 is a fragmentary transverse vertical sectional view taken on line 4—4 of Fig. 3.

Fig. 5 is a fragmentary longitudinal vertical sectional view taken on line 5—5 of Fig. 6.

Fig. 6 is a fragmentary top plan view of the device with parts broken away.

Fig. 7 is a longitudinal transverse sectional view taken on line 7—7 of Fig. 5.

Fig. 8 is a vertical transverse sectional view taken on line 8—8 of Fig. 5.

Fig. 9 is a view of a film having a plurality of micro images arranged thereon.

Fig. 10 is a fragmentary transverse vertical sectional view taken similar to Fig. 4 and illustrating a modified embodiment of the invention.

Fig. 11 is a fragmentary transverse vertical sectional view taken similar to Fig. 2, and illustrating another modified embodiment of the invention.

Referring to the drawings, and particularly to Figs. 1 to 9, which illustrate the preferred embodiment of the invention, the numeral 20 designates a casing having side walls 21, top 22, ends 23, and a bottom 24. The casing is of generally rectangular form throughout and is elongated. The top 22 is provided with a narrow elongated film receiving slot 25 extending longitudinally thereof and preferably from end to end of casing 20. A similar slot 26 may be formed in the bottom 24 of the casing.

A pair of L-shaped guides 27 are carried by the side walls 21 of the casing adjacent the upper end thereof and extend parallel to the top 22 of the casing. The guides 27 are preferably arranged with one flange thereof extending vertically and secured to the side wall and with the other flange or leg thereof extending horizontally inwardly from the upper end of the first mentioned flange or leg. A horizontal plate 28 is secured to and extends inwardly from the lower end of the guide 27. The plates 28 extend in the same plane and are spaced apart a substantial distance for purposes to be hereinafter set forth.

The front wall 21 of the casing is provided at an intermediate point thereof, preferably located centrally between the ends of the casing, with an inturned screw threaded collar 29 defining an opening in which may be received a tubular member 30 screw threaded at 31. Member 30 may either be a carrier for a projecting lens or a carrier for a photographic lens and shutter. It will be understood that each device will be provided with both the photographic lens and shutter unit, and with a projecting lens unit, so that the selected one of the units may readily be attached to the device by means of the screw threads. The tubular member 30 is adapted to project into the casing a predetermined distance, with the inner end thereof terminating slightly short of the longitudinal vertical center plane of the casing.

A chamber 32 is fixedly secured to the rear wall 21 of the casing in alignment with the tubular member 30. Chamber 32 has a restricted tubular opening 33 at its inner end adapted to mount a lens 34 in axial alignment with tube 30. A socket 35 adapted to receive an electrical light bulb 36 is also positioned within the chamber 32. The inner end of chamber 32 is spaced from the inner edge of tubular member 30.

A film holder 37 is mounted within the casing 20 between plates 28 and is adapted for longitudinal sliding movement guided by the guides 27 and plates 28. The film holder preferably comprises a pair of transverse vertical end members 38 interconnected at their upper ends by a pair of aligned, outwardly extending, elongated plates 39 adapted to bear upon the plates 28 and to seat under the upper flange of the guides 27. The plates 39 terminate in close spaced relation to each other to provide a slot therebetween vertically aligned with and parallel to the slot 25 in the top 22 of the casing 20. A pair of vertical plates 40, spaced apart a distance substantially equal to the width of slot 25 and in parallel relation to define part of a narrow film receiving passage, extend between the end members 38 and are provided with laterally out-turned portions 41 bearing against the inner faces of the end members, and with terminal portions 42 bearing against the opposite side edges of the end members 38 and secured thereto by securing members 43. The plates 40 terminate in spaced relation above the lower ends of the end members 38, and a pair of narrow elongated plates 44, aligned with the plates 40, extend between the lower ends of the end members and are of the same end configuration as the upper plate portions to fit around the end members 38 and to be secured thereto by securing members 45. The plates 44 are spaced below the plates 40 to provide an elongated passage 46 extending longitudinally and horizontally through the film holder 37 between end members 38 thereof.

Each end member 38 of the film holder journals a pair of short longitudinally extending shafts 47 in horizontally opposed relation and opposite the longitudinal center of the elongated opening 46 of the film holder. At their inner ends the shafts 47 mount rollers 48 which extend into the elongated openings 46 in the film holder whereby they may grip the opposite vertical margins of a film 49 therebetween. At their outer ends the shafts 47 mount meshing gears 50. A stud shaft 51 is journaled in each end member 38 above one of the shafts 47 and mounts a pinion 52 meshing with the adjacent gear 50. An elongated shaft 53 is journaled at its opposite ends in the end members 38 and mounts complementary gears 54, each meshing with the adjacent pinion 52. Shaft 53 projects beyond the gear 54 adjacent one end member and mounts a bevel gear 55. Gear 55 meshes with a horizontal bevel gear 56 carried by the lower end of a vertical arbor 57 journaled in a longitudinally extending horizontal ear 58 projecting from the upper end of one of the members 38. The arbor 57 extends upwardly through an elongated slot 57' in the top 22 of the casing and mounts a hand piece 58' at its upper end.

It will be understood that the plates 40 and 44 are so positioned that they may slidably extend between the inner ends of the lens mount 30 and the light chamber 32 of the casing. Also, it may be desired to provide a horizontal flange 59 projecting outwardly from the upper end of each plate 40 and underlying the plates 39 and aligned with the plates 28.

An elongated vertical plate 60 parallel to the side walls of 21 of the casing is vertically slidable in the casing 20 in a guided movement at the longitudinal center of the casing. Plate 60 is preferably positioned in face engagement with the plate 40 adjacent the lens mount. The upper end of plate 60 is provided with a hand grip portion 61. Adjacent the lower end of the plate 60 is provided one or more rectangular openings. As shown, plate 60 has two vertically spaced openings 62 and 63 of different sizes. The plate 60 is adapted to be positioned so that one of the openings 62—63 thereof is positioned in registration with the opening 46 in the film holder to control and limit the area of the film which is exposed to the lens mount 30.

The device is primarily intended to be employed with flat film 49, which, as best shown in Fig. 9, has a plurality of images 66 arranged thereon in longitudinal and transverse alignment. When a photographing lens mount 30 is mounted in the casing, the device is adapted to photographically record the images 66 upon the film 49. When a projecting lens unit 30 is mounted in the casing, any selected one of the images 66 on film 49 may be projected onto the screen or the viewing plate of a reading device (not shown) by means of the light projected from chamber 32 through the film and through projecting lens unit 30.

The operation of the device is as follows:

A flat film 49 is inserted into the casing 20 through the slot 25 and passes between the plates 40 of the film holder and into engagement with the rollers 48 on the film holder. Thereupon the hand piece 58' may be rotated to rotate the rollers 48 at opposite ends of the device in equal amounts for the purpose of feeding or advancing the film within the film holder in a vertical direction. It will be noted that the short length of the rollers 48 insures that only the vertical margins of the film will be engaged thereby so that the film emulsion will not be touched. The plates 40 and 44 are spaced apart a short distance ample to afford a sliding clearance for the film therebetween and small enough to hold the film in flat form therebetween. The film is advanced in flat form in the film holder to a suitable starting point and the film holder is then shifted adjacent to one end of the casing. Assuming that images 66 are to be recorded on the film 49, the lens and shutter mount 30 will have been attached to the casing. As soon as the film and film holder are properly positioned, the operation of taking photographs can begin. After each restricted area of the film in line with lens mount 30 and exposed thereto through the registering restricted openings in the plate 60 and in the film holder at 46 has had an image recorded thereon, the film holder may be slid to another position and another image recorded on the film in predetermined spaced relation to the first image. When the film holder has been slid or moved step-by-step from one end of the casing 20 to the other, the film advancing means is operated by rotating hand wheel 58' to cause the rollers 48 to vertically shift the film within the film holder. Thereupon, another horizontal row or series of images may be photographically recorded upon the film. This sequence of operation is continued until the selected number of micro images have been recorded upon the film.

It will be understood that any suitable means may be utilized for the purpose of indicating the position of the film within the casing and with relation to the lens mount, and for insuring equal spacing between the images upon the film in both horizontal and vertical direction. This means may comprise indicia of any desired and suitable character as is well understood in the art. For example, indicia 67 and 68 may be located upon the casing adjacent the slot 25 in the cover of the casing 20, and indicator 60 may be mounted upon one end member of the film holder to extend through slot 25 to designate the position of the film holder longitudinally of casing 20. Similar indicia 70 may be provided upon one vertical edge of the film 49 to guide the film feeding movement by rollers 48; or an angle indicating means (not shown) may be utilized in connection with the hand piece 58' for indicating the angle of rotation to advance the film one row. Such indicating means are of value for the purpose of accurately arranging the images upon the film during the recording operation, and also for relocating or selecting any individual image when the device is used as a reader.

A modified embodiment of the invention, adapted to accommodate the use of elongated strips of film in the device, is illustrated in Fig. 10. In this embodiment of the invention, standards 80 are mounted upon the plate 39 adjacent opposite ends thereof, and standards 81 are secured to the lower ends of the end members 38. A longitudinally extending shaft 82 is journaled in standards 81 and mounts a spool 83 around which one end of an elongated film is adapted to be rolled. The film extends upwardly through the film holder between the plates 40—44 as in the preferred embodiment, and around a spool 84 preferably mounted upon a shaft 85 of rectangular cross section and removably journaled in standard 80. It will be understood that shaft 85 may extend outwardly to project from one of the end walls 23, and may be provided with a hand grip for rotating the same.

The sliding movement of the spool 84 on the shaft 85 is necessary in order to accommodate movement of the film holder longitudinally of the device; and it will also be observed that the shaft 85 must be of a length substantially equal to the length of the casing. In the event a hand piece is used on the outer end of shaft 85 the film feed rollers 48 may be dispensed with. However, if desired, the film feed rolls 48 may be retained, and in this event the use of a shaft 85 of rectangular cross section, and of a length equal to the length of the casing, may be dispensed with, and a spool and shaft arrangement similar to that at the lower end of the film holder may be substituted therefor.

It will be observed that the film holder positions the portion of the film aligned with lens mount 30 in flat form to insure accurate recording of images thereon. In this connection, it is essential in micro photography to use a film having an emulsion which is of very fine grain in order to record the object accurately and faithfully upon the film in the minute size in which such images are recorded. The character of the film and the small size of the image render flat positioning of the film essential. If desired, the elongated film may be retained in roll form after the images are recorded thereon, or it may be cut in the short lengths to provide flat film of substantially card size for convenience in filing and handling.

Another modified embodiment of the invention is illustrated in Fig. 11. In this embodiment, the hand piece 58', the arbor 57, and the bevel gears 55 and 56 are omitted. In place thereof a vertical rack 90, pressed upwardly by spring 91 and passing through an opening 92 in the top of the casing, normally meshes with the gear 54 at one end of the film holder. Rack 90 passes through a guide 93 in which it may be rocked or tilted laterally to optionally engage and disengage the gear 54. A plurality of stops 94 at different vertical heights may be slidably mounted in one of the side walls 21 of the casing to project into the path of movement of the rack 90 and thereby limit the downward movement of said rack. The projection of a selected stop 44 into the path of rack 90 assures accuracy of the vertical spacing of the rows of images recorded upon the film, and at the same time does not require exercise of particular care in the operation of the device to obtain that accuracy.

In the form of the device illustrated, the rack will normally be upwardly spring pressed to a position with the enlargement or collar 95 thereon engaging the lower face of the top 21 of the casing. When the rack 90 is downwardly spring pressed against the action of spring 91, it meshes with gear 54 and rotates the same to operate feed rolls 48 until projected stop 94 is engaged. Thus, the film will be advanced the exact desired extent in the film holder. When the end of downward movement of the rack has been reached, the rack is tilted laterally in the guide 93 to disengage the rack from the gear 54, and is permitted to return to its normal upwardly spring pressed position, illustrated in dotted lines. Thereupon the device is in condition for another operation.

I claim:
1. A film positioning device comprising a casing having a longitudinal slot in one wall thereof, a guide in said casing parallel to said slot, a film holder slidable on said guide and including a pair of close spaced facing side plates, spaced top plates, end members, and supporting means engaging said top guide, said plates extending parallel to said slotted wall with the space therebetween aligned with said slot, rollers parallel to said guide journaled by said end members and gripping opposite margins of a film within said holder, and means for simultaneously and equally rotating said rollers to advance said film in said slot and holder.

2. A film positioning device comprising a casing having a longitudinal slot in one wall thereof, a guide in said casing parallel to said slot, a film holder slidable on said guide and including a pair of spaced plates, end members, and supporting means engaging said guide, said plates extending perpendicular to said slotted wall with the space therebetween aligned with said slot, rollers parallel to said guide journaled by said end members and gripping opposite margins of a film, means for simultaneously and equally rotating said rollers, said plates having opposed elongated openings parallel to said guide, and a member juxtaposed to and parallel to one of said plates and having a restricted aperture therein registering with said plate openings.

3. A film positioning device comprising a casing having a longitudinal slot in one wall thereof, a guide in said casing parallel to said slot, a film holder slidable on said guide and including a pair of spaced plates, end members, and supporting means engaging said guide, said plates extending perpendicular to said slotted wall with the space therebetween aligned with said slot, rollers parallel to said guide journaled by said end members and gripping opposite margins of a film, means for simultaneously and equally rotating said rollers, and means including a gear train carried by each end member, a shaft connecting corresponding gears of said gear trains, and means projecting from said casing and having a driving connection with one gear train.

4. A photographic device comprising a pair of close spaced parallel opposed plates adapted to freely receive a film therebetween, end members connecting said plates, a pair of opposed rollers carried by each end member and adapted to grip opposite margins of a film therebetween, means for simultaneously and equally rotating said rollers to shift a film between said plates, said plates, end members, rollers, and roller rotating means constituting a film holder, a casing, a lens system carried by said casing means for shifting said film holder in said casing in a predetermined path perpendicular to the axis of said lens system and to the direction of film movement by said rollers, and apertured light shielding means aligned with said lens system and juxtaposed to said film holder.

5. A photographic device comprising a pair of close spaced parallel plates adapted to freely receive a film therebetween, end members connecting said plates, a pair of opposed rollers carried by each end member and adapted to grip opposite margins of a film therebetween, means for simultaneously and equally rotating said rollers to shift a film between said plates in one direction, said plates, end members, rollers, and roller rotating means constituting a film holder, a casing, and means for shifting said film holder in said casing in a predetermined path perpendicular to the direction of film movement by said rollers, at least one of said plates having an elongated opening therein parallel to the path of movement of said film holder, and a tubular member adapted to mount a lens and a shutter, said tubular member being carried by and projecting from said casing with its inner end terminating adjacent said apertured plate and in register with the aperture thereof.

6. A photographic device comprising a casing, a film holder slidable in a predetermined path in said casing, said film holder including close spaced parallel plates adapted to receive and position a film in flat form, rollers journaled at opposite ends of said film holder about axes parallel to the path of movement of said holder and adapted to grip the margins of a film in said holder, means carried by said holder and projecting from said casing for simultaneously and equally rotating said rollers, at least one plate having on elongated opening parallel to the path of movement of said holder, and a lens mounting element carried by and projecting through said casing with its inner end terminating adjacent to and registering with said elongated plate opening.

7. A photographic device comprising a casing, a film holder slidable in a predetermined path in said casing, said film holder including close spaced parallel plates adapted to receive and position a film in flat form, rollers journaled at opposite ends of said film holder about axes parallel to the path of movement of said holder and adapted to grip the margins of a film in said holder, means carried by said holder and projecting from said casing for simultaneously and equally rotating said rollers, said plates having opposed elongated openings parallel to the path of movement of said holder, a lens mounting member carried by said casing and registering with said openings, and a light chamber opposed to and aligned with the lens mounting member and having a restricted opening registering with said plate openings.

8. A photographic device as defined in claim 7, and a slide juxtaposed to one plate and projecting through said casing, said slide having a plurality of spaced openings of different sizes adapted to control the area of the film exposed to the path of light traveling from said chamber and through said lens mount.

9. A photographic device comprising a casing having a film receiving slot in its top, a lens mount carried by and terminating within said casing, a film holder, a pair of laterally aligned plates projecting from the upper end of said holder and separated to define the mouth of a film receiving chamber of said film holder, and guides carried by opposite sides of said casing for slidably supporting said film holder, said film holder having an elongated opening below said plates with which the inner end of said lens mount registers, said plates constituting baffles to prevent impingement upon said film at said openings of light entering said casing at said slot.

10. A photographic device comprising a casing, a lens mount carried by and projecting into said casing, a film holder slidable in said casing, transversely of and juxtaposed to said lens mount, means carried by said holder for advancing film in said holder, said film holder having a passage adapted to slidably receive a film in flat form and an elongated opening extending parallel to the direction of movement of said holder and registering with said lens mount, and a slide positioned adjacent said film holder and having an opening registering with said lens mount for limiting the area of the film exposed to said lens mount.

11. A film positioning device comprising a casing having a longitudinal slot in one wall thereof, a guide in said casing parallel to said slot, a film holder aligned with said slot and slidable on said guide, said holder including a pair of close spaced parallel plates adapted to receive and maintain a film in flat form therebetween, two sets of short rollers carried by said holder and adapted to grip opposite margins of a film within said holder, the axes of said rollers extending parallel to said guide, and means carried by said holder and projecting from said casing for simultaneously and equally turning said rollers to shift said film in said film holder and slot.

12. A photographic device comprising a casing, a lens system carried by said casing, a film holder slidable in said casing in a predetermined path transversely of the axis of said lens system, said film holder including end members and close spaced side members for positioning a film therebetween in substantially flat form, rollers journaled to opposite end members about axes parallel to the path of movement of said holder and adapted to grip and shift a film in said holder transverse of the axis of said lens system and of the path of movement of said holder, and means carried by said holder and projecting from said casing for simultaneously and equally rotating said rollers.

13. A photographic device comprising a casing, a lens system carried by said casing, a film holder slidable in said casing in a predetermined path transversely of the axis of said lens system, said film holder including a pair of close spaced parallel plates adapted to receive and position a film in substantially flat parallel relation therebetween, rollers journaled at opposite ends of said film holder about axes parallel to the path of movement of said holder and adapted to grip the margins of a film in said holder, and means carried by said holder and projecting from said casing for simultaneously and equally rotating said rollers to shift said film in said film holder.

14. A photographic device comprising a casing, a lens mount carried by and projecting into said casing, a film holder slidable in said casing in a path adjacent to the inner end of and transverse of said lens mount, means carried by said holder for advancing film therein transverse of said path, said holder including opposed plates defining a passage adapted to receive and maintain a film in flat form and having an elongated opening parallel to said path and registering with said lens mount, and a plate slidable on one holder plate past the inner end of the lens mount and having a plurality of apertures therein selectively registerable with said lens mount and holder opening.

JAMES A. REYNIERS.

Patent No. 2,369,980

JAMES A. REYNIERS

Granted February 20, 1945

The above entitled patent was extended November 27, 1951, under the provisions of the act of June 30, 1950, for 292 days from the expiration of the original term thereof.

*Commissioner of Patents.*